Patented Mar. 9, 1937

2,072,913

UNITED STATES PATENT OFFICE 2,072,913

INTERMEDIATE FOR PREPARATION OF HORMONES AND PROCESSES FOR ITS PRODUCTION

John Weijlard, Rahway, N. J., assignor to Merck & Co. Inc., Rahway, N. J., a corporation of New Jersey No Drawing. Application March 24, 1936, Serial No. 70,673

3 Claims. (Cl. 260—131)

This invention relates to an improved process for the preparation of the chlorketone Δ5,6-3-chlor-etio-cholenone-(17) from dehydroandrosterone, suitable for use as a valuable intermediate for the derivation of certain male sex hormones.

Butenandt and Dannenbaum, [Zeit. Physiol. Chem. 229, 192 (1934)] have reported the production of a chlorketone by treating urine concentrates (prepared for the extraction of hormone bodies) with hydrochloric acid. Their conclusions in this respect were based on their findings that they had succeeded in isolating small quantities of chlor-dehydroandrosterone among the substances obtained from urine concentrates which had been treated with hydrochloric acid.

Butenandt and his co-workers [Zeit. Physiol. Chem. Vol. 237, November, 1935, p. 70] also more recently described a process for treating synthetic dehydroandrosterone with hydrochloric acid in methyl alcohol solution. With this process, they effected the isolation of a complex mixture of chlor-compounds. From this mixture they obtained a yield of about 1% chlor-dehydroandrosterone.

My own experiments together with the information which can be found in the literature indicate that the preparation using hydrogen chloride is impractical for commercial purposes.

In view of the fact that this chlor-ketone is an important intermediate in the further steps for the commercial production of certain male sex hormones, it was sought to discover a practical method whereby a smooth reaction with substantial yield could be readily obtained.

My objective was to find a satisfactory process which would comprise the treatment of dehydroandrosterone with a chlorinating agent which would be specifically active for the purpose with this ketone and which would avoid unwanted side reactions, such as resulted from the treatment with hydrochloric acid as above described. Phosphorous pentachloride was eventually found to give a smooth reaction and a yield highly satisfactory for commercial use.

The specific example given below sets forth a preferred method of practicing my invention when pure isolated dehydroandrosterone is used as the starting material. It will be understood, however, that I do not wish to limit myself to the precise step shown, as it will be evident to those skilled in the art that various modifications can be made therein as to the precise steps employed, without departing from the scope and spirit of the invention as disclosed in the general description.

Example

About 90 gm. of dehydroandrosterone is triturated with about 80 gm. of phosphorus pentachloride in a porcelain dish. The mixture liquefies after a short time and is worked for about 10 minutes, or until the reaction is completed. It is then dissolved in ether, the ether solution washed, first with dilute alkali and then with water, and is then dried and thereafter the solvent is evaporated. The dried residue is purified by recrystallization from methanol, and a yield of about 50 gm. of chlor-ketone, having a melting point of 153° C., is obtained.

I claim as my invention:

1. The process for the production of Δ5,6-3-chlor-etio-cholenone-(17), which comprises reacting upon dehydroandrosterone with phosphorus pentachloride.

2. The process for the production of Δ5,6-3-chlor-etio-cholenone-(17), which comprises triturating dehydroandrosterone with phosphorus pentachloride until liquefaction sets in, working the material until the reaction is completed, dissolving the resulting mixture in ether, washing the ether solution with dilute alkali and then with water, evaporating the solvent, and purifying the chlor-ketone, obtained as a dry residue, by recrystallization from methanol.

3. The process for the production of Δ5.6-3-chlor-etio-cholenone-(17), which comprises rubbing about nine parts of dehydroandrosterone with about eight parts of powdered phosphorus pentachloride until liquefaction sets in, working the material until the reaction is completed, dissolving the resulting mixture in ether, washing the ether solution with dilute alkali and then with water, evaporating the solvent, and purifying the chlor-ketone obtained as a dry residue, by recrystallization from methanol.

JOHN WEIJLARD.